March 24, 1959     E. P. LONGERICH     2,879,002
ANALOG SQUARING AND SQUARE ROOTING CIRCUITS
Filed July 26, 1956
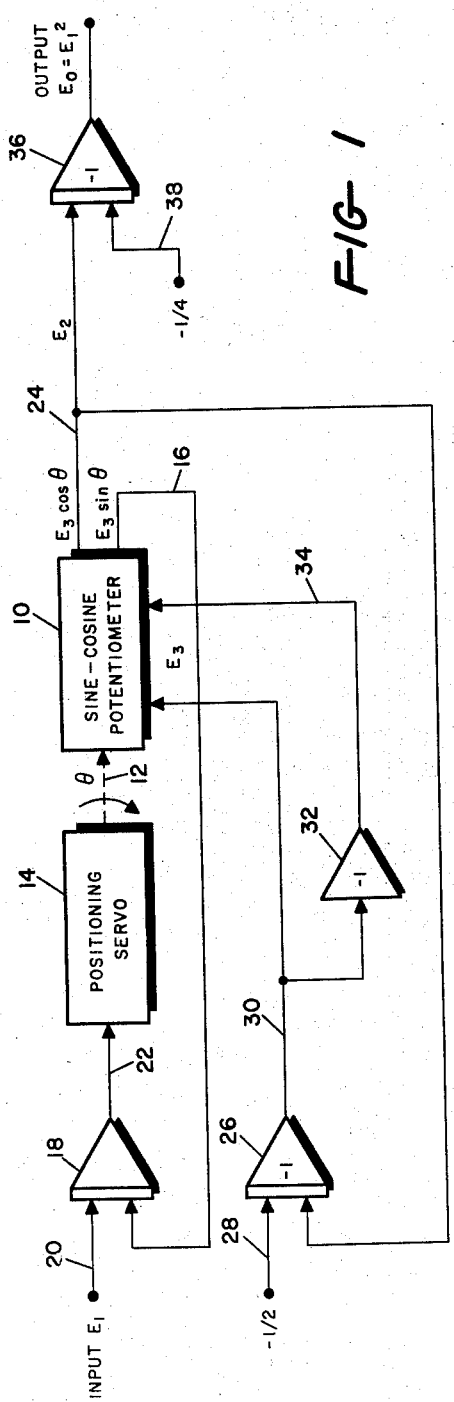
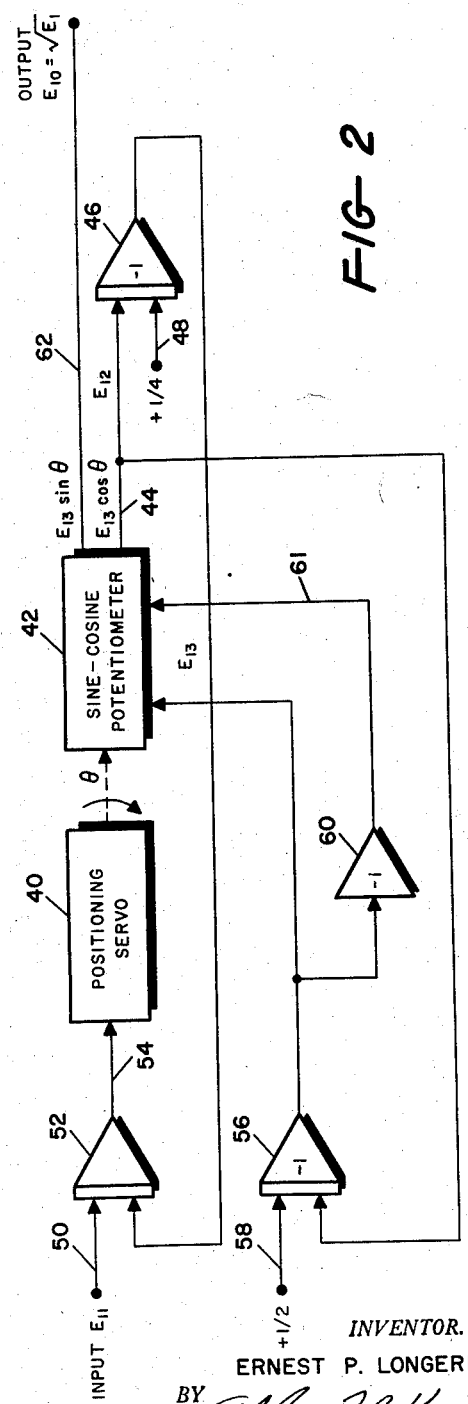
INVENTOR.
ERNEST P. LONGERICH
BY
AGENT

United States Patent Office 2,879,002
Patented Mar. 24, 1959

2,879,002

ANALOG SQUARING AND SQUARE ROOTING CIRCUITS

Ernest P. Longerich, Inkster, Mich., assignor to Bendix Aviation Corporation, Detroit, Mich., a corporation of Delaware Application July 26, 1956, Serial No. 600,324

4 Claims. (Cl. 235—186)

This invention relates to analog computing devices, and more particularly to electronic circuitry for providing output voltages which vary as the functions of either the squares or square roots of continuously varying input voltages.

Analog computers which operate on electric quantities that are proportional to numbers in order to perform mathematical operations on those numbers are well known in the art. These devices include circuits which provide either squares or square roots of input quantities. One common squaring circuit involves the use of nonlinear potentiometers which must be specially desiged to handle a particular input range. Other devices use servo controlled potentiometers in selfbalancing bridge circuits or vacuum tubes which have square input to output relationships. These devices are all complex and resultingly expensive.

The present invention provides a novel form of such circuitry which is relatively simple in construction and operation so as to provide a unit which is susceptible to economic manufacture and to ease of maintenance.

When used as a circuit for obtaining square roots, the present device may be provided with an input which represents the sum of a group of numbers. This feature is of particular value in ranging circuits in which the elevation and rectangular position of an object is known and it is desired to obtain the distance from the ranging point to the object. Since that range equals the square root of the sum of the squares of each of the three coordinates by providing an input which is equal to the sum of the coordinates, the range may be continuously and automatically obtained.

The operational range of the present device is limited only by the ratings of its components. Vacuum tube squaring circuits which are known to the prior art are limited in their operational range by the nonlinearity of the tube's parameters. Since an output is obtained as soon as the single servo mechanism of the unit becomes stablized, the unit is quick in operation relative to the squaring circuits of the prior art which utilized bridges with variable arms, each of which had to be balanced.

The unit essentially comprises a sine cosine potentiometer, the shaft of which is continuously varied in accordance with the value of an input signal. One of the outputs of the potentiometer is fed back and combines with the circuit's input signals to control a servo mechanism which drives the potentiometer shaft. One of the outputs of the potentiometer is also fed back through associated circuitry to provide the input voltage to the potentiometer. These connections are such that one of the outputs of the potentiometer represents either the square or the square root of the circuit's input signal depending upon the exact nature of the connections.

It is, therefore, an object of the present invention to provide squaring and square rooting circuits which are simple in construction, quick in operation and operable within a wide range of values.

It is a further object of the present invention to provide a square root circuit which can continuously and automatically operate upon the sum of a plurality of numbers.

Other objects, advantages and applications of the present invention are made apparent by the following detailed description of two embodiments of the invention.

The description makes reference to the accompanying drawings in which Figure 1 is a schematic diagram of one embodiment to the invention designed to provide an output which is a square of an input quantity and Figure 2 is a schematic representation of an embodiment of the invention so designed as to provide an output which is the square root of an input quantity.

In an embodiment of the invention arranged for squaring, a sine cosine potentiometer 10 has its input shaft 12 driven by a positioning servo mechanism 14. The potentiometer 10 is so constructed that one of the two outputs represents its voltage input multiplied by the sine of the positioning of the shaft 12. The other output quantity represents the product of its voltage input and the cosine of the angular position of the shaft 12. Such potentiometers are manufactured by a number of companies and their construction and operation are well known to those skilled in the art.

The positioning servo mechanism 14 may be one of several types of actuators which provide a rotational shaft position which is angularly proportional to their own signal.

The output 16 of the sine winding of the potentiometer 10 is fed back to one input of an operational amplifier 18. The other input of the amplifier 18 is connected to an input signal 20 that is to be squared. The amplifier 18 is so constructed as to provide an output signal 22 which is equivalent to the difference between the output of the sine winding 16 and the signal to be operated upon input 20. This signal 22 then actuates the positioning servo mechanism 14 in such a manner as to cause the shaft 12 of the potentiometer 10 to seek a position at which its sine output 16 is equal to the input 20. At that point the error signal 22 which drives the servo mechanism 14 is reduced to a minimum value.

The output of the cosine winding 24 of the potentiometer 10 is connected to the second operational amplifier 26. This amplifier 26 has as its second input a voltage 28 which may range through all values, both positive and negative, but is preferably adjusted to one-half volt or an integral multiple thereof.

The amplifier 26 is so constructed as to provide an output 30 which is equal to the negative of the sum of the source 28 and the cosine output 24. The output 30 is connected to one of the winding terminals of the potentiometer 10 and also to another operational amplifier 32 which also provides an output 34 which is the negative of its input. This output 34 is connected to another winding terminal of the potentiometer 10. This second negative source 34 is necessary so that when the shaft 12 is rotated to an angular position at which either the sine or the cosine is negative, a negative output may be obtained from those windings.

The cosine output 24 is connected to one input of an operational amplifier 36. The other input of the emplifier 36 is a voltage source 38 which may range through any value but is preferably one quarter volt or a multiple thereof equal to the integral multiplying factor used with the source 28. The amplifier 36 provides an output which is equal to the negative of the sum of its inputs.

That the output of the amplifier 36 is equal to the square of the input 20 for all values that do not exceed the ratings of the components is readily shown by the following analysis:

Where:

$E_0$=output voltage $E_1$ = input voltage
$E_2$ = output of the cosine winding 24 of potentiometer 10
$E_3$ = voltage inputs 32 and 34 to potentiometer 10, and
$\theta$ = angle of the shaft 12 of the positioning servomotor 14

$$E_0 = -(E_2 - \tfrac{1}{4}) \qquad (1)$$
$$E_3 = -(E_2 - \tfrac{1}{2}) \qquad (2)$$
$$E_2 = E_3 \cos \theta \qquad (3)$$
$$E_1 = -E_3 \sin \theta \qquad (4)$$

Squaring (3) and (4) we obtain:

$$E_2{}^2 = E_3{}^2 \cos^2 \theta \qquad (5)$$

and $$E_1{}^2 + E_3{}^2 \sin^2 \theta \qquad (6)$$

Adding (5) and (6):

$$E_1{}^2 + E_2{}^2 = E_3{}^2$$

or $$E_2{}^2 = E_3{}^2 - E_1{}^2 \qquad (7)$$

Substituting (1) and (2) in (7):
$$(\tfrac{1}{4} - E_0)^2 = (E_0 - \tfrac{1}{4} + \tfrac{1}{2})^2 - E_1{}^2$$
$$(\tfrac{1}{4} - E_0)^2 = (E_0 + \tfrac{1}{4})^2 - E_1{}^2$$
$$E_0{}^2 - \tfrac{1}{2} E_0 + \tfrac{1}{16} = E_0{}^2 + \tfrac{1}{2} E_0 + \tfrac{1}{16} - E_1{}^2$$
$$E_0 = E_1{}^2 \qquad (8)$$

Therefore, whenever the servo 14 is in a balanced position the output voltage is equal to the square of the input voltage.

It is apparent from the above analysis and from the circuitry that the inputs 28 and 38 act to normalize the output of the circuit from the random function of the square of the input to an exact square of the input. Any variation in the input 28 from the normal 0.5 multiplies the output voltage by the factor $$\frac{0.5 + \Delta V}{0.5}$$

where $\Delta V$ is the increase over 0.5. In order to normalize the output it is necessary to divide it by this factor and to change the input 38 to a voltage $$\frac{0.5 + \Delta V}{2}$$

It is to be noted that the gain of the feedback loop of the positioning servo 14 is dependent upon the voltage $E_3$ which is impressed across the windings of the potentiometer 10. Within limits imposed by the exact ratings of the components of the loop, the gain of the loop, and thus its response time, is proportional to this voltage $E_3$. The voltage $E_3$ is in turn increased by any positive increment in the source 28.

In order to obtain a satisfactory response rate from the device it becomes necessary under certain circumstances to increase the inputs of the sources 28 and 38 and normalize the output $E_0$ by dividing it with a resistance network (not shown).

The circuit of Figure 2 illustrates how the square root of a quantity may be obtained through use of techniques similar to those which are used to obtain the square.

As in the previous embodiment a positioning servo-mechanism 40 controls the shaft of a sine cosine potentiometer 42. The cosine output 44 of the potentiometer 42 feeds the input of an operational amplifier 46 which adds the ¼ volt input of source 48 to it. The inverted output of the amplifier 46 is added to the circuit input signal 50 in another operational amplifier 52 which controls the position of the servo 40 with its output error signal 54.

The cosine winding output 44 is also connected to the input of an operational amplifier 56 which adds in the ½ volt or multiple thereof of source 58. The output of the amplifier 56 connects to both the potentiometer 42 input and to an inverting amplifier 60 which provides the potentiometer 42 with a negative source 61.

The square root output of the circuit is taken directly from the sine winding 62 of the potentiometer 42. That this output does constitute the square root of the input 50 is shown by the following:

Where:

$E_{10}$ = output voltage 62
$E_{11}$ = input voltage 50
$E_{12}$ = cosine winding output 44
$E_{13}$ = input voltage to potentiometer 62, and
$\theta$ = angle assumed by shaft of potentiometer 42 at steady state input $$E_{11} = E_{12} + \tfrac{1}{4} \qquad (9)$$
$$E_{13} = E_{12} + \tfrac{1}{2} \qquad (10)$$
$$E_{10} = E_{13} \sin \theta \qquad (11)$$
$$E_{12} = E_{13} \cos \theta \qquad (12)$$

Squaring (11) and (12) and adding:

$$E_{10}{}^2 + E_{12}{}^2 = E_{13}{}^2 \qquad (13)$$

Substituting (9) and (10) in (13):

$$E_{10}{}^2 + (E_{11} - \tfrac{1}{4})^2 = (E_{11} - \tfrac{1}{4} + \tfrac{1}{2})^2 \qquad (14)$$
$$E_{10}{}^2 + (E_{11} - \tfrac{1}{4})^2 = (E_{11} + \tfrac{1}{4})^2 \qquad (15)$$
$$E_{10}{}^2 + E_{11}{}^2 - \tfrac{1}{2} E_{11} + \tfrac{1}{16} = E_{11}{}^2 + \tfrac{1}{2} E_{11} + \tfrac{1}{16}$$
$$E_{10}{}^2 = E_{11} \qquad (16)$$
$$E_{10} = \sqrt{E_{11}} \qquad (17)$$

The input sources 48 and 58 may again be varied but the output 62 will have to be normalized.

With the exception of the point of application of the normalizing voltages, the circuits of Figures 1 and 2 differ only in the fact that in the first case the output of the sine winding is fed back to control the servo, while in the second case the output of the cosine winding is fed back to accomplish the control. Since this feedback acts to equate the output of the potentiometer to the input the major difference lies whether we equate the input to the multiple of a sine function or a cosine function.

This last square root circuit is of particular value in solving ranging equations of the type $r^2 = X^2 + Y^2 + Z^2$. By introducing an input 50 which is equal to the sum of the squares of these ranging coordinates, the associated ranging distance may be continuously and automatically obtained.

The squares of the ranging coordinates might be obtained through use of the apparatus of Figure 1.

By providing other suitable combinations and series of circuits of the types shown in Figures 1 and 2, it would be possible to obtain a wide variety of powers and roots of one or a group of variables.

The circuits, therefore, are seen to provide simple and flexible means for obtaining the powers or roots of quantities.

Having thus described my invention, I claim:

1. A circuit for producing an output having a magnitude which is a function of the square of the magnitude of the input to the circuit, including, a sine-cosine potentiometer, a servo for positioning the variable contacts of the potentiometer, the input to the circuit being introduced to one input of the servo and the sine output of the potentiometer being introduced to the other input of the servo, first means for summing the cosine output of the potentiometer and a first quantity of particular magnitude and for introducing a positive value of said sum to one input of the potentiometer and a negative value of said sum to the other input of the potentiometer and second means for summing the cosine output of the potentiometer and a second quantity having one-half the magnitude of the first quantity, the sum output of said second means being the output of the circuit and having a magnitude which is a function of the square of the input to the circuit.

2. A circuit as recited in claim 1 wherein said first means includes a summing inverter amplifier and an inverter amplifier and said second means is an inverter amplifier.

3. A circuit for producing an output having a magnitude which is a function of the square root of the magnitude of the input to the circuit, including a sine-cosine potentiometer, a servo for positioning the variable contacts of the potentiometer, the input to the circuit being introduced to one input of the servo, first means for summing the cosine output of the potentiometer and a first quantity of particular magnitude and for introducing a positive value of said sum to one input of the potentiometer and a negative value of said sum to the other input of the potentiometer, second means for summing the cosine output of the potentiometer and a second quantity having one-half the magnitude of the first quantity and for introducing said sum to the other input of the servo, the sine output of the potentiometer being the output of the circuit and having a magnitude which is a function of the square root of the input to the circuit.

4. A circuit as recited in claim 3 wherein said first means includes a summing inverter amplifier and an inverter amplifier and said second means is an inverter amplifier.

References Cited in the file of this patent
UNITED STATES PATENTS
2,688,442    Droz et al. _____ Sept. 7, 1954